(12) United States Patent
Airody et al.

(10) Patent No.: US 12,544,158 B2
(45) Date of Patent: Feb. 10, 2026

(54) ROBOTICALLY ASSISTED SURGICAL REAMING

(71) Applicant: Orthosoft ULC, Montreal (CA)

(72) Inventors: Ajith Airody, L'Île-Bizard (CA); Alexis Balli, Montreal (CA); Ian Basta, Montreal (CA); Bruno Chabot, Montreal (CA); Karine Dupuis, Montreal (CA); VanGiau Luu, St-Leonard (CA); Jeremie Menard, Montreal (CA); Aiden Reich, Montreal (CA); Yann Zimmermann, Montreal (CA)

(73) Assignee: Orthosoft ULC, Montreal (CA)

( * ) Notice: Subject to any disclaimer, the term of this patent is extended or adjusted under 35 U.S.C. 154(b) by 781 days.

(21) Appl. No.: 17/858,767

(22) Filed: Jul. 6, 2022

(65) Prior Publication Data

US 2023/0023476 A1     Jan. 26, 2023

Related U.S. Application Data

(60) Provisional application No. 63/222,628, filed on Jul. 16, 2021.

(51) Int. Cl.
*A61B 34/30* (2016.01)
*A61B 17/00* (2006.01)
(Continued)

(52) U.S. Cl.
CPC .............. *A61B 34/30* (2016.02); *A61B 17/00* (2013.01); *A61B 17/1617* (2013.01);
(Continued)

(58) Field of Classification Search
CPC ............ A61B 17/1613; A61B 17/1615; A61B 17/1617; A61B 17/1666; A61B 17/1684; A61B 34/30; A61B 2034/305
See application file for complete search history.

(56) References Cited

U.S. PATENT DOCUMENTS 5,817,096 A     10/1998   Salyer
8,753,346 B2 *   6/2014   Suarez .................. A61B 34/74
                                                        606/81
(Continued)

FOREIGN PATENT DOCUMENTS

DE           10148022         5/2003
WO          2019079634        4/2019

OTHER PUBLICATIONS

"Canadian Application Serial No. 3,167,542, Examiners Rule 86(2) Report mailed Oct. 19, 2023", 6 pgs.
(Continued)

*Primary Examiner* — Larry E Waggle, Jr.
(74) *Attorney, Agent, or Firm* — SCHWEGMAN LUNDBERG & WOESSNER, P.A.

(57) ABSTRACT

An reaming system can be connectable to a robotic surgical system including an end effector of a robotic arm. The reaming system can include a reaming guide and a reamer. The reaming guide can include a body releasably couplable to the end effector at a proximal portion of the body and a housing located at a distal portion of the body. The reamer can be operable to ream bone. The reamer can include a support releasably couplable to the housing to secure the reamer to the reaming guide and the end effector. The reamer can include a cutting head connected to the support, the cutting head rotatable with respect to the housing when the support is coupled to the housing.

14 Claims, 10 Drawing Sheets

(51) Int. Cl.
*A61B 17/16* (2006.01)
*B23D 77/00* (2006.01)

(52) U.S. Cl.
CPC ...... *A61B 17/1666* (2013.01); *A61B 17/1684* (2013.01); *B23D 77/00* (2013.01); *A61B 2017/00477* (2013.01)

(56) References Cited

U.S. PATENT DOCUMENTS

| | | |
|---|---|---|
| 2004/0220554 A1 | 11/2004 | Lechot et al. |
| 2006/0217728 A1 | 9/2006 | Chervitz et al. |
| 2018/0353248 A1* | 12/2018 | Bowling .............. B25J 17/0208 |
| 2020/0246025 A1* | 8/2020 | Akhlaghpour ........ A61F 2/4609 |

OTHER PUBLICATIONS

"European Application Serial No. 22185077.9, Extended European Search Report mailed Nov. 30, 2022", 7 pgs.
"European Application Serial No. 22185077.9, Communication Pursuant to Article 94(3) EPC mailed Jul. 9, 2024", 4 pgs.

\* cited by examiner

ROBOTICALLY ASSISTED SURGICAL REAMING

CLAIM OF PRIORITY

This application claims the benefit of U.S. Provisional Patent Application Ser. No. 63/222,628, filed on Jul. 16, 2021, the benefit of priority of which is claimed hereby, and which is incorporated by reference herein in its entirety.

BACKGROUND

The present disclosure relates generally to apparatus and devices used for reaming bone during robotically-assisted surgical procedures, and more particularly, to robotic joint replacement procedures, or arthroplasty procedures. Joint replacement procedures include shoulder replacement procedures (or shoulder arthroplasties) and hip replacement procedures (or hip arthroplasties). During a shoulder arthroplasty, for example, a reamer can be used to shape a patient's bone to prepare the bone to receive an implant.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A joint replacement procedure, or arthroplasty, can involve making an access incision in a region of a patient, such as a shoulder or a hip. Cutting instruments can then be used to ream the bone (such as a glenoid or acetabulum) in order to cut and shape the bone to receive an implant. Optionally, various cutting heads can be used during an operation to shape the bone. For example, different cutting heads may be used to create bores of different sizes while others may be used for cutting or surfacing. Also, during a robotic surgery, the end effector may be used to hold or support tools other than cutting heads, such as placement tools or registration tools. Changing of cutting heads or tools of the end effector can take considerable time during a procedure where many changes are required.

The present disclosure helps to address these issues by providing a reaming system having a quick disconnect mechanism. The system can include a reaming retainer and the reamer can include a support to interface with the retainer and to quickly lock the reamer to the retainer. The reamer or cutting head can thereby be quickly and easily unlocked and removed from the retainer to help reduce a duration of a procedure. Further, the reaming retainer can be curved or non-linear to help avoid interference between the reaming retainer and tissue of the patient during reaming operations.

The above discussion is intended to provide an overview of subject matter of the present patent application. It is not intended to provide an exclusive or exhaustive explanation of the invention. The description below is included to provide further information about the present patent application.

Figure 1B:
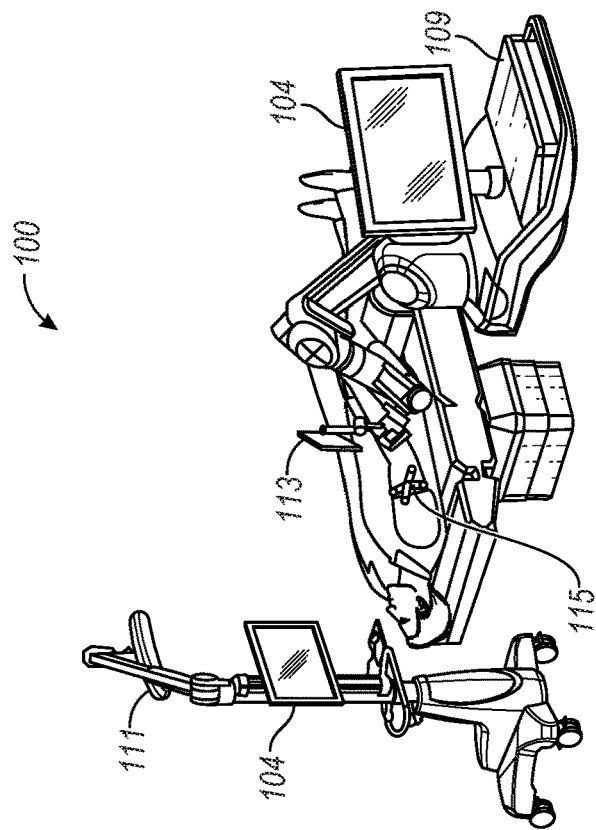
FIG. 1B illustrates a perspective view of a robotic surgical system.
Figure 1A:
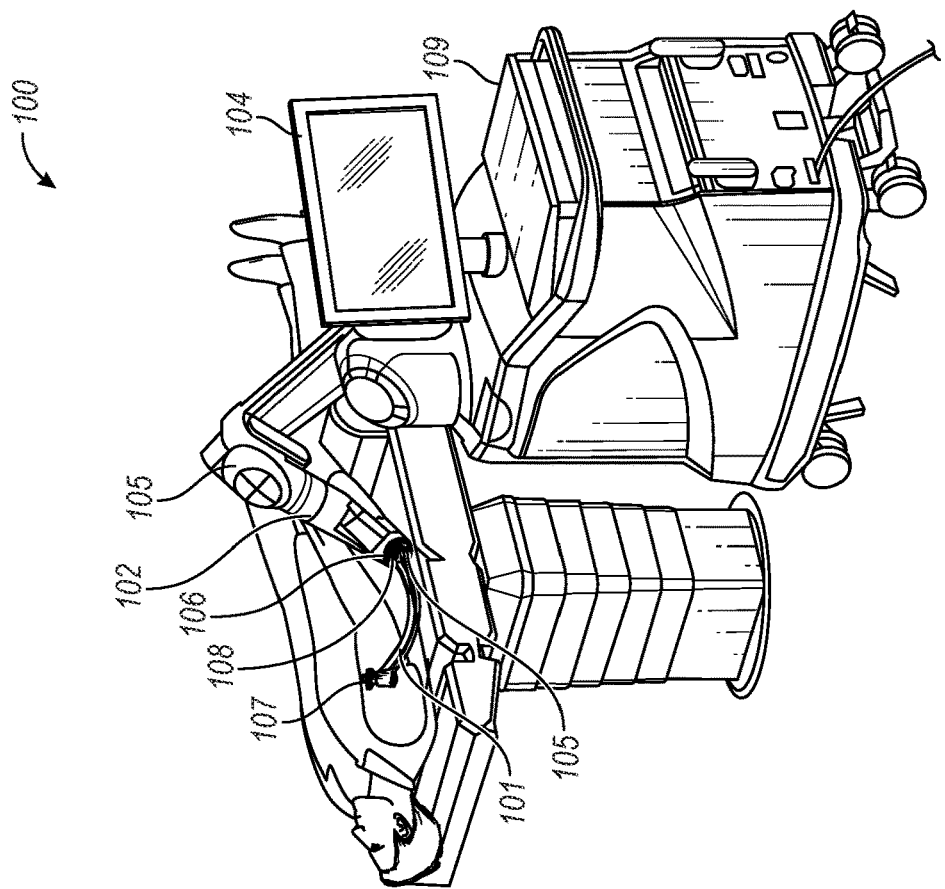
FIG. 1A illustrates a perspective view of a robotic surgical system.

FIG. 1A illustrates a perspective view of a robotic surgical system 100 including a reaming system 101 coupled to a robotic arm 102. FIG. 1B illustrates an isometric view of the robotic surgical system 100. FIGS. 1A and 1B are discussed together below.

The reaming system 101 can be coupled to the robotic arm 102. The robotic arm 102 can be a 6 degree-of-freedom (DOF) robot arm, such as the ROSA® robot from Medtech, a Zimmer Biomet Holdings, Inc. company. The robotic arm 102 can be controlled by a surgeon with various control devices or systems. For example, a surgeon can use a control system (e.g., a controller that is processor-implemented based on machine-readable instructions, which when implemented cause the robotic arm to move automatically or to provide force assistance to surgeon-guided movement) to guide the robotic arm 102. The robotic arm 102 can include two or more articulating joints 105 capable of pivoting, rotating, or both, to provide a surgeon with wide range of adjustment options. A surgeon can also use anatomical imaging, such as displayed on a display screen 104, to guide and position the robotic arm 102. Anatomical imaging can be provided to the display screen 104 with various imaging sources, such as one or more cameras positioned on the reaming system 101, or intraoperative fluoroscopy, such as a C-arm.

The anatomical imaging, for example, can be imaging of internal patient anatomy within an incision 107. The incision 107 can be made in a variety of positions on a patient. For example, in a shoulder arthroplasty procedure, the incision 107 can be made in a shoulder region of a patient. The incision 107 can be configured to allow the reaming system 101, coupled to the robotic arm 102, to access a bone surface, or other anatomy of the patient. The robotic arm 102 can include an end effector 106. The end effector 106 can include a base 108, which can be configured to couple the reaming system 101 to the robotic arm 102.

The robotic system 100 can include a computing system 109, which can also communicate with display screens 104 and a tracking system 111 (shown in FIG. 1B). The tracking system 111 can be operated by the computing system 109 as a stand-alone unit. The computing system 109 can optionally utilize the Polaris optical tracking system from Northern Digital, of Waterloo, Ontario, Canada. The tracking system 111 can monitor a plurality of tracking elements, such as tracking elements 113 (shown in FIG. 1B). The tracking elements 113 can be affixed to objects of interest, to track locations of multiple objects within a surgical field.

The tracking system 111 can function to create a virtual three-dimensional coordinate system within the surgical field for tracking patient anatomy, surgical instruments, or portions of the end effector 106 or robotic arm 102. Tracking elements 115 can be tracking frames including multiple IR reflective tracking spheres, or similar optically tracked marker devices. In one example, the tracking elements 115 can be placed on or adjacent one or more bones of patient. In other examples, the tracking elements 115 can be placed on the end effector 106 and/or an implant to accurately track positions within the virtual coordinate system. In each instance the tracking elements 115 can provide position data, such as a patient position, a bone position, a joint position, an implant position, a position of the robotic arm 102, or the like.

The reaming system 101 can include a reamer, as shown in further detail below, which can be configured to cut and shape a bone surface of a patient. In the operation of some examples, the reaming system 101 can be coupled to the robotic arm 102 in preparation for a surgical procedure. The surgical procedure can be a shoulder arthroplasty; but can also be other types of joint replacement procedures. A surgeon can make an incision 107 in a shoulder region of a patient. The robotic arm 102 can guide and position the reaming system 101 to, and within, the incision 107. A cutting head (or other portions of the reamer) can be guided to a bone surface of a patient using the robotic arm 102 in a cooperatively-controlled mode utilizing robotic guidance. The reamer can be selectively controlled to rotate the cutting head to ream a bone surface of the patient, to shape the bone surface to receive an implant. The cutting head can be quickly coupled and uncoupled to the reaming system 101, as discussed in further detail below, to help save time during reaming operations. In the embodiments discussed below, like numerals can represent like components.

Figure 2A:
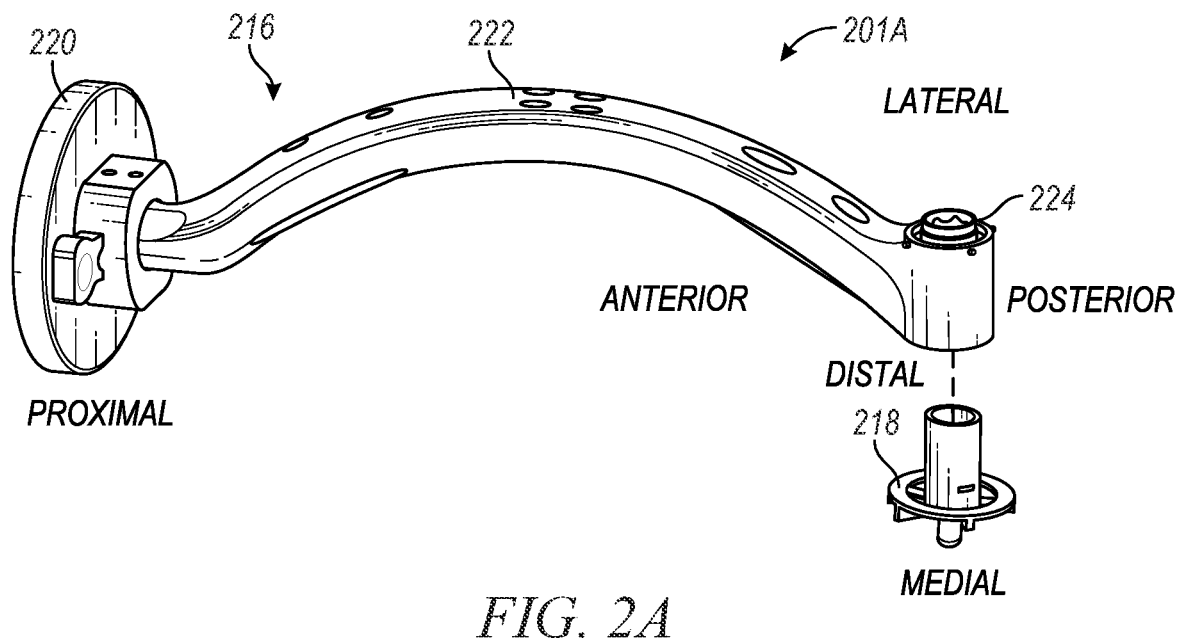
FIG. 2A illustrates an isometric view of a reaming system for a robotic surgical system.

FIG. 2A illustrates an isometric view of a reaming system 201A (or reaming system) for a robotic surgical system. The reaming system 201A can be configured for quick connection and disconnection of a cutting head for robotically-guided reaming operations.

The reaming system 201 can include a reaming guide 216 and a reamer 218. The reaming guide 216 can include a proximal connector 220, a body 222, and a housing 224. FIG. 2A also shows orientation indicators Anterior, Posterior, Lateral, Medial, Proximal, and Distal.

The connector 220 can be a plate or other connector to releasably connect the body 222 to the robotic arm, such as via the end effector 106 of the surgical arm 102. The body 222 can be an elongate member connected to the connector 220 and the housing 224. The body 222 can be curved between the connector 220 and the housing 224. The body 222 can be C-shaped, U-shaped, V-shaped, or a variety of other shapes. Such a curved shape can help to reduce interaction between the body 222 and tissue of the patient during reaming operations.

The housing 224 can be connected to and located at a distal portion of the body 222. The housing 224 can be sized and shaped to receive and retain the reamer 218 therein to connect the reamer 218 to the body 222 and to the surgical arm 102, such as to allow the reamer 218 to be operated to ream bone while being guided to a proper reaming location by the robotic arm.

Figure 2B:
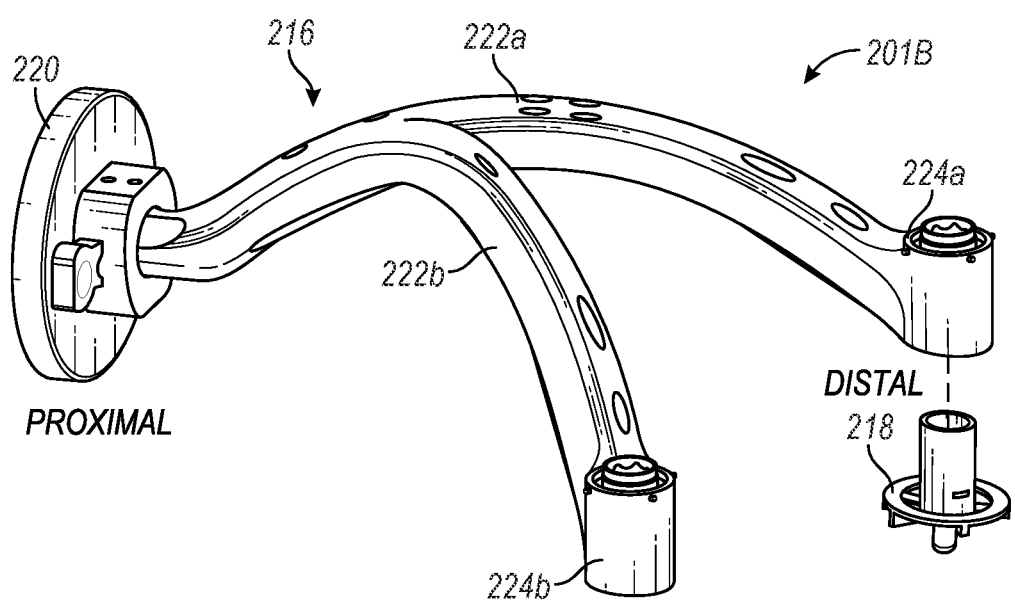
FIG. 2B illustrates an isometric view of a reaming system for a robotic surgical system.

FIG. 2B illustrates an isometric view of a reaming system 201B for a robotic surgical system. FIG. 2B also shows orientation indicators Proximal and Distal. The reaming system 201B can be similar to the reaming system 201A; the reaming system 201B can differ in that the reaming system 201B can include a body 222.a and a body 222b, such that the reaming system 201B can include multiple housings 224a and 224b. Such a reaming system with multiple housings can allow for one housing (e.g., 224a) to be operated, such as using the cutting head 218 for a reaming operation, while the other housing 224b is being prepared for the next step in the procedure. For example, the housing 224b can receive a different cutting head, guide, or the like, during a reaming operation using the cutting head 218 mounted to the housing 224a. Such a two-armed reaming system 201B can help to save time during a procedure.

Figure 3A:
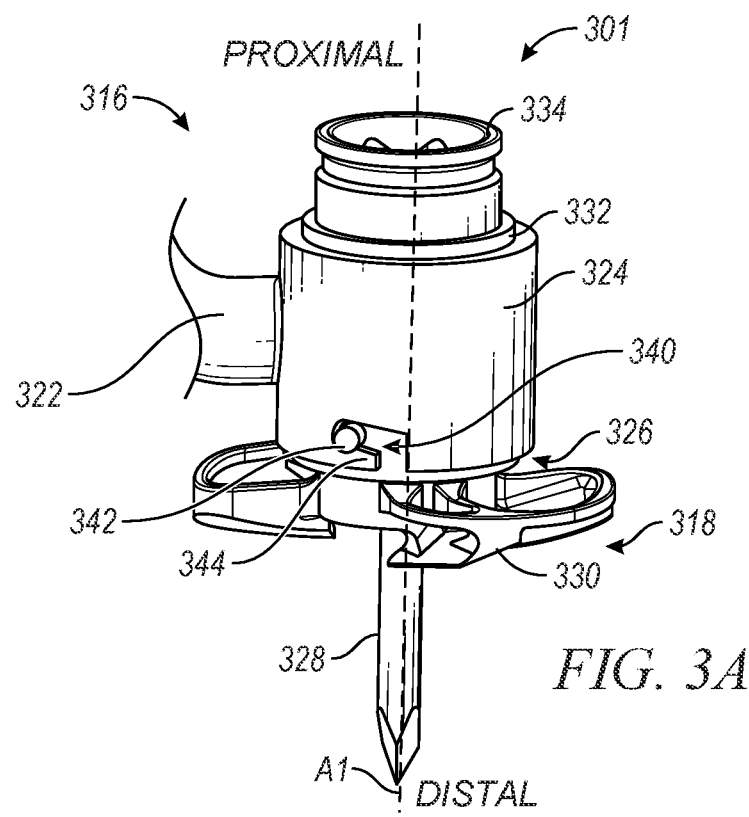
FIG. 3A illustrates an isometric view of a portion of a reaming system for a robotic surgical system.
Figure 3B:
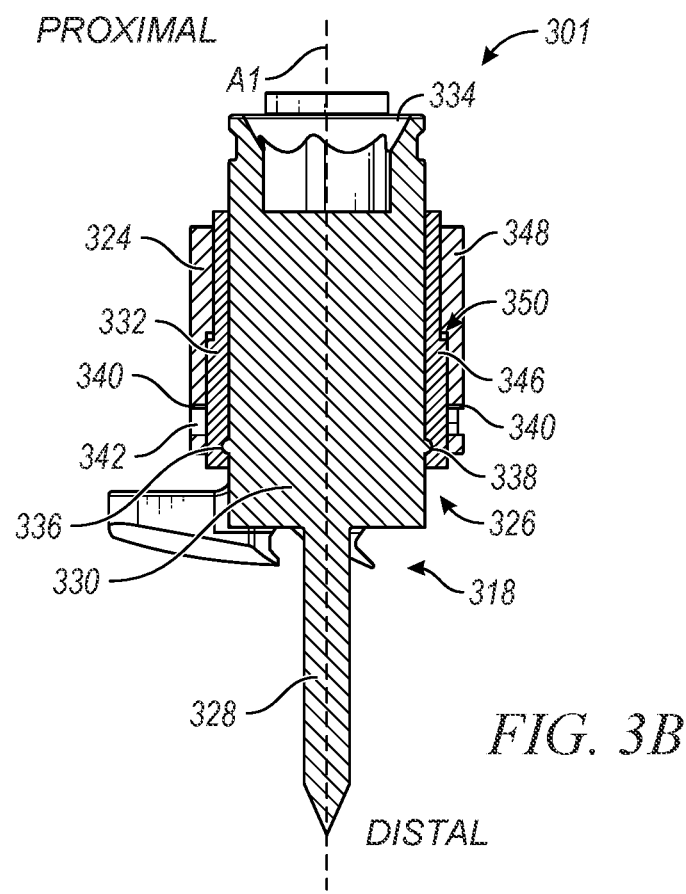
FIG. 3B illustrates a cross-sectional view of a portion of a reaming system for a robotic surgical system.

FIG. 3A illustrates an isometric view of a portion of a reaming system 301 for a robotic surgical system. FIG. 3B illustrates a cross-sectional view of a portion of the reaming system 301 for a robotic surgical system. FIGS. 3A and 3B show one example of a quick connection interface for connecting and disconnecting a cutting head or reamer to a reaming guide. FIGS. 3A and 3B are discussed together below. FIGS. 3A and 3B also show orientation indicators Proximal and Distal and axis A1. The reaming systems discussed above and below can be modified to include one or more components of the reaming system 301.

The reamer 318 can include a support 326 and a cutting head 328. The support 326 can include a shaft 330 and a bushing 332. A reaming guide 316 can include a housing 324 connected to a distal end of a body 322. The support 326 can be connected to the cutting head 328 and the shaft 330 can include a driving feature 334 and a ring 336.

The shaft 330 can be generally cylindrical, but can have other shapes in other examples, such as hexagonal, octagonal, or the like. The driving feature 334 can be located at, or connected to, a proximal portion of the shaft 330 and can be configured to receive and retain a driving instrument or bit to rotate the shaft 330 and the cutting head 328 when the reamer 318 is coupled to the housing 324. The driving feature 334 (or driving interface) can be hexolubular, hexagonal (Allen), cross-recess (Phillips), standard, or the like.

The ring 336 can extend radially outward from an outer surface of the shaft 330 to engage with a recess 338 of the bushing 332. The Ting 336 can extend around a circumference of the shaft 330 or can extend around a portion of the shaft 330. The ring 336 can be configured (e.g., sized and shaped) to engage with a recess 338 (e.g., a groove) of the bushing 332 such that the engagement can limit relative axial movement (with respect to the axis A1) of the shaft 330 (and therefore the cutting head 328) with respect to the bushing 332.

The cutting head 328 can be connected to the shaft 330. The cutting head 328 can be a rotary cutting head configured to cut and shape bone. The cutting head 328 can be rotatably coupled to the housing 324. The cutting head 328 can be rotatable with respect to the housing 324 and the bushing 332 when the support 326 is coupled to the housing 324. Optionally, the reamer 318 can be releasably couplable to the housing 324 to secure the reamer 318 to the reaming guide 316 and the end effector, as discussed below.

The housing 324 can include a slot or slots 340, such as on opposing sides, as shown in FIG. 3B. The housing 324 can include 1, 2, 3, 4, 5, or the like slots. The slots 340 can each extend through at least a portion of the housing 324. For example, the slot 340 can extend through a distal edge of the housing 324 and can extend circumferentially around at least a portion of the housing 324. The bushing 332 can include a projection 342 extending radially outward from an outer surface of the bushing. The projection 342 can be a boss, knob or other feature, which can have a cylindrical shape, but can have other shapes in other examples, such as a cuboid, hexagonal prism, octagonal prism, or the like.

During connection of the cutting head 318 to the housing 324, the projection 342 can be inserted into the slot 340 through the distal end of the housing 324 as the bushing 332 is inserted into the housing 324. The projection 342 can engage a proximal portion of the slot 340 and the reamer 318 (and bushing 332) can be rotated about its axis to move the projection 342 into the slot 340 until the projection 342 reaches a notch 344 of the slot 340. The slot 340 can be located on a distal portion of the slot 340 and its engagement with the projection 342 can help to limit circumferential movement of the projection 342 when the projection 342 is located in and engaged with the notch 344.

Also, the bushing 332 can include a collar 346 and the housing 324 can include an undercut portion 348 sized and shaped complementary to the collar 346, such that the collar 346 can engage the undercut portion 348 to limit relative proximal axial translation of the bushing 332 with respect to the housing. Optionally, a biasing element 350 can be located between the collar 346 and the undercut portion 348.

The biasing element 350 can be a resilient element such as a spring. In some examples, the biasing element 350 can be a compression coil spring, a wave spring or compressible and resilient members comprised of resilient materials such as rubbers, plastic, or the like. The biasing element 350 can engage the collar 346 of the bushing 332 and the undercut portion 348 of the housing 324 to bias the bushing 332 distally. In operation, the biasing element(s) 350 can help retain the projection 342 in the notch 344 by biasing the projection 342 toward or into the notch 344 to help to limit relative circumferential movement of the bushing 332 with respect to the housing 324.

The cutting head 318 can be disconnected from the housing 324 by forcing the cutting head 318 and therefore the bushing 332 and projection 342 proximally to compress the biasing element 350 and move the projection 342 out of the notch 344. The cutting head 318 can then be rotated to move the projection 342 in the slot 340 to allow for distal removal of the projection 342 from the slot 340 and removal of the bushing 332 from the housing 324. In this way, cutting heads (and optionally other instruments) can be quickly and easily removed from the reaming guide 316.

Figure 4A:
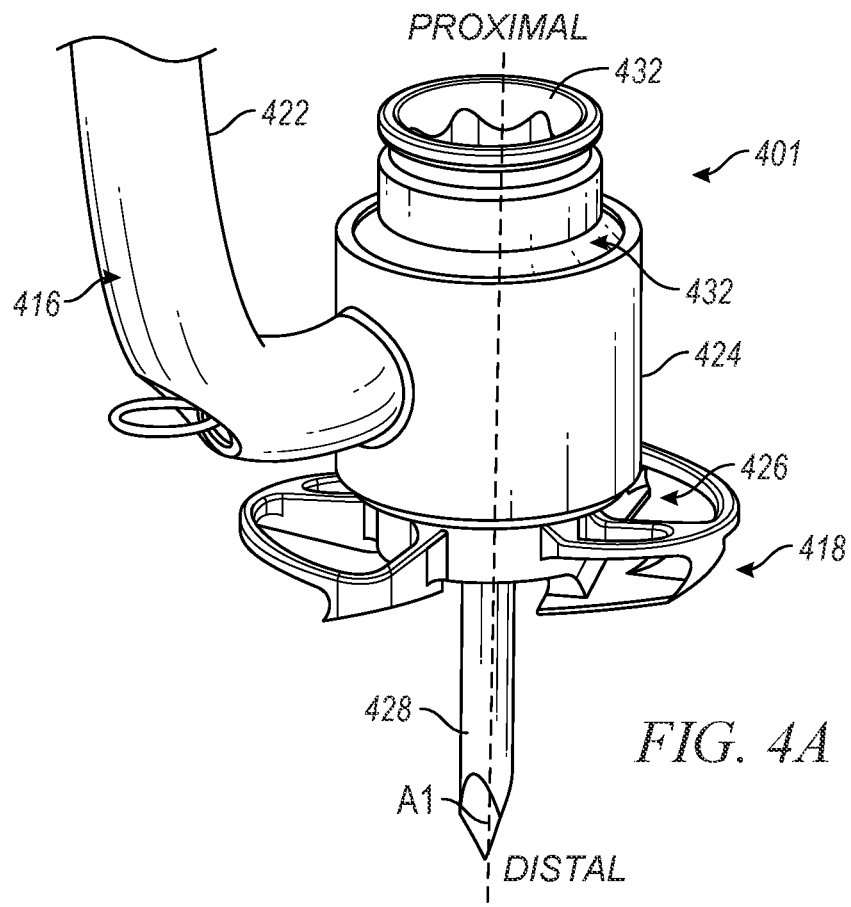
FIG. 4A illustrates an isometric view of a portion of a reaming system for a robotic surgical system.
Figure 4B:
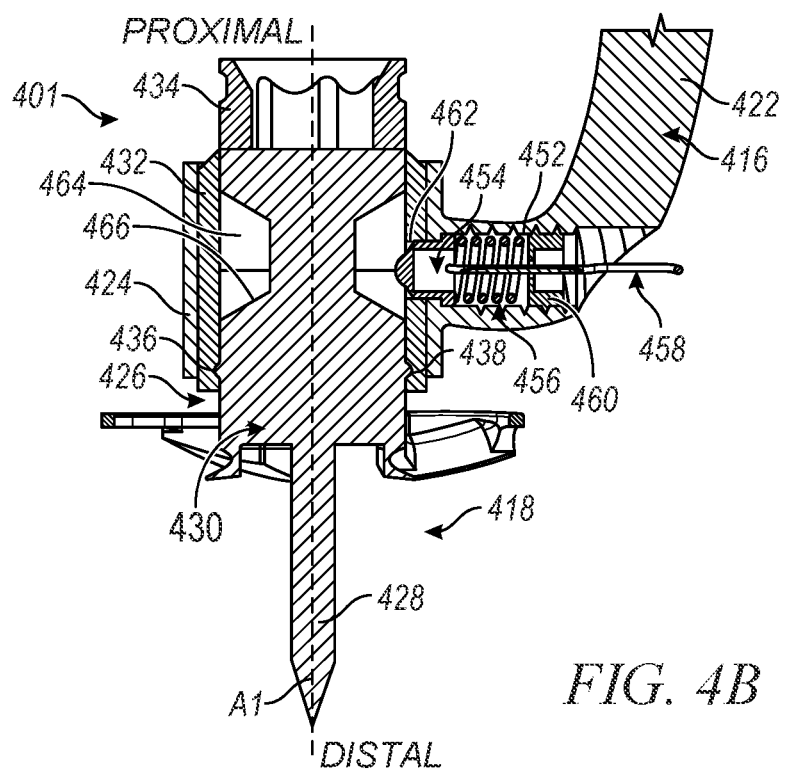
FIG. 4B illustrates a cross-sectional view of a portion of a reaming system for a robotic surgical system.
Figure 4C:
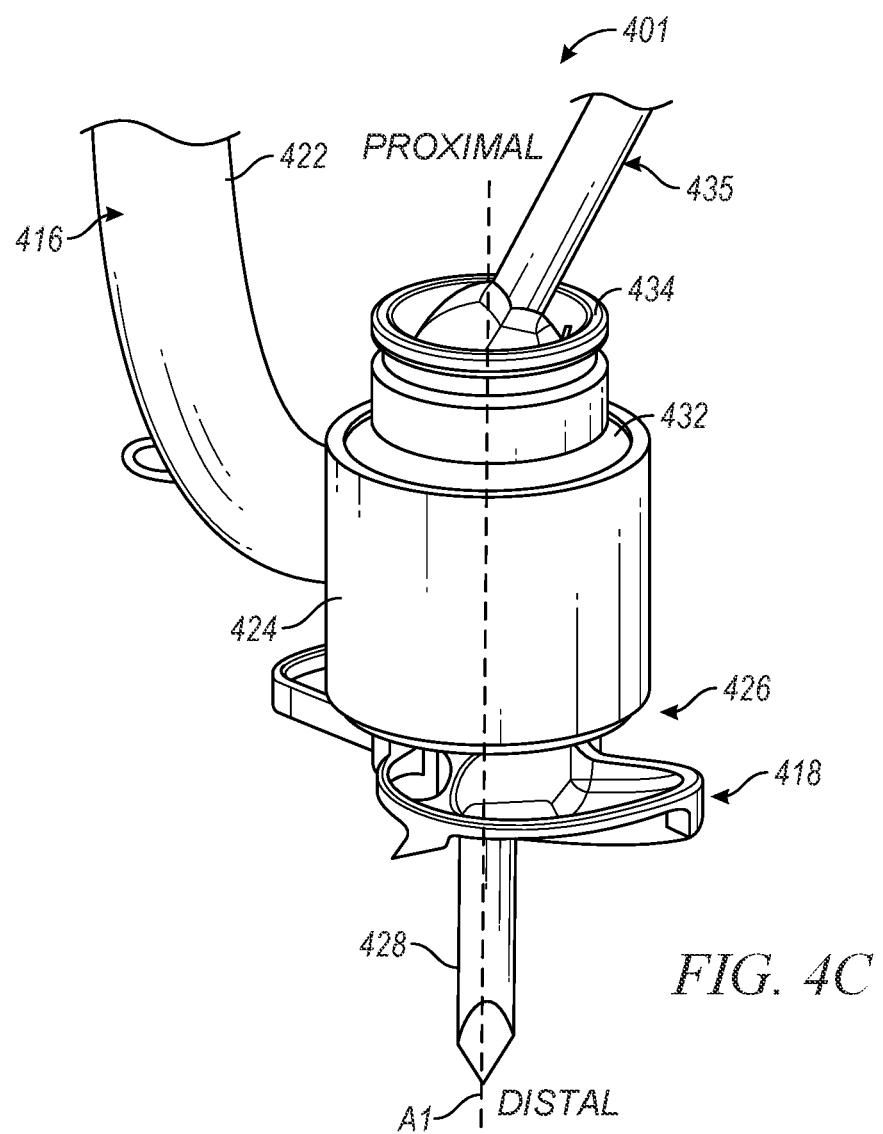
FIG. 4C illustrates an isometric view of a portion of a reaming system for a robotic surgical system.

FIG. 4A illustrates an isometric view of a portion of a reaming system 401 for a robotic surgical system. FIG. 4B illustrates a cross-sectional view of a portion of a reaming system for a robotic surgical system. FIG. 4C illustrates an isometric view of a portion of a reaming system for a robotic surgical system. FIGS. 4A-4C show one example of a quick connection interface for connecting and disconnecting a cutting head or reamer to a reaming guide. FIGS. 4A-4C are discussed together below. FIGS. 4A-4C also show orientation indicators Proximal and Distal and axis A1. The reaming systems discussed above and below can be modified to include one or more components of the reaming system 401.

A reaming guide 416 can include a housing 424 connected to a distal end of a body 422. The reamer 418 can include a support 426 and a cutting head 428. The support 426 can include a shaft 430 (shown in FIG. 4B) and a bushing 432. The support 426 can be connected to the cutting head 428 and the shaft 430 can include a driving feature 434 and a ring 436. The shaft 430 can be generally cylindrical, but can have other shapes in other examples, such as hexagonal, octagonal, or the like.

The driving feature 434 can be located at a proximal portion of the shaft 430 and can be configured to receive and retain a driving instrument 435 (shown in FIG. 4C) or bit to rotate the shaft 430 and the cutting head 428 when the reamer 418 is coupled to the housing 424. The driving feature 434 (or driving interface) can be hexolubular, hexagonal (Allen), cross-recess (Phillips), standard, or the like. The driving instrument can be a powered rotary device, such as a driver.

The reaming guide 416 can include a bore 452 that extends through a portion of the body 422 and the housing 424. A plunger 454, biasing element 456, release 458, and stop 460 can be located at least partially within the bore 452. The bushing 432 can include a recess or bore 462 extending into a projection 464 of the bushing 432. Optionally, the shaft 430 can include an undercut 466 to receive a portion of the bushing 432 therein to allow the recess 462 to extend beyond a radially outer surface of the shall 430. This mating arrangement can help to limit relative axial movement of the bushing 432 with respect to the shaft, while helping to provide sufficient material for the recess 462.

The stop 460 can be secured within the bore 452, such as through a threadable engagement with the bore 452. Optionally, the stop 460 can be secured in other ways, such as using pins, adhesives, or other fasteners. The plunger 454 can be movable within the bore 452 and within the bore or recess 462. The biasing elements 456 can be a compression coil spring, wave spring, or compressible and resilient member comprised of resilient materials such as rubbers, plastic, or the like.

The biasing element 456 can be engaged with the stop 460 and the plunger 454 to bias the plunger 454 away from the stop 460 and towards the bore 462 of the bushing 432, The release 458 can be an elongate member connected to the plunger 454 and passing through the biasing element 456, the stop 460, and through the bore 452 to extend from the body 422 such that the release 458 is accessible to a user external to the body 422.

In operation, the plunger 454 can be releasably engageable with the bushing 432 to secure the bushing 432 to the housing 424. More specifically, when the shaft 430 and bushing 432 are inserted into the housing 424, the bore or recess 462 of the bushing 432 can be alignable with the bore 452 of the housing 424, which can allow the plunger 454 to extend into the recess 462 or bore. The plunger 454 can be engaged with the recess 462 to secure the bushing 432 to the housing 424 and to limit rotation and axial movement of the bushing 432 with respect to the housing 424.

When it is desired to remove the i-earner 418 from the housing 424, the release 458 can be pulled on sufficiently to overcome the biasing element 456 to allow the release 458 to be moved away from the housing 424 to retract the plunger 454 from the recess 462. When the plunger 454 is retracted from the recess 462, the reamer 418 can be removed from the housing 424. In this way, cutting heads (and optionally other instruments) can be quickly and easily removed from the reaming guide 416.

Figure 5A:
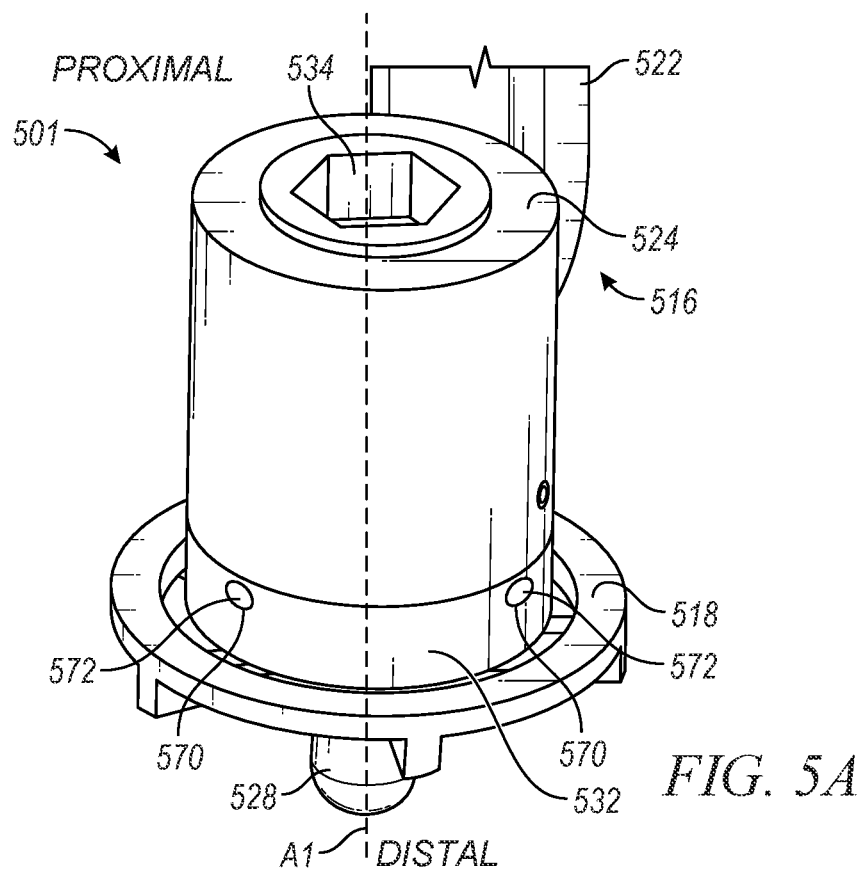
FIG. 5A illustrates an isometric view of a portion of a reaming system for a robotic surgical system.
Figure 5B:
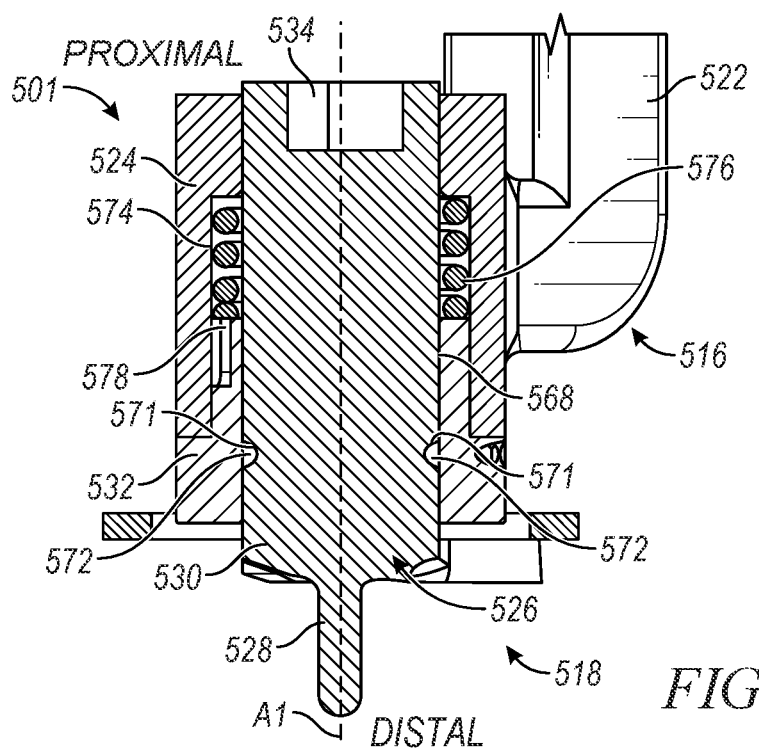
FIG. 5B illustrates a cross-sectional view of a portion of a reaming system for a robotic surgical system.
Figure 5C:
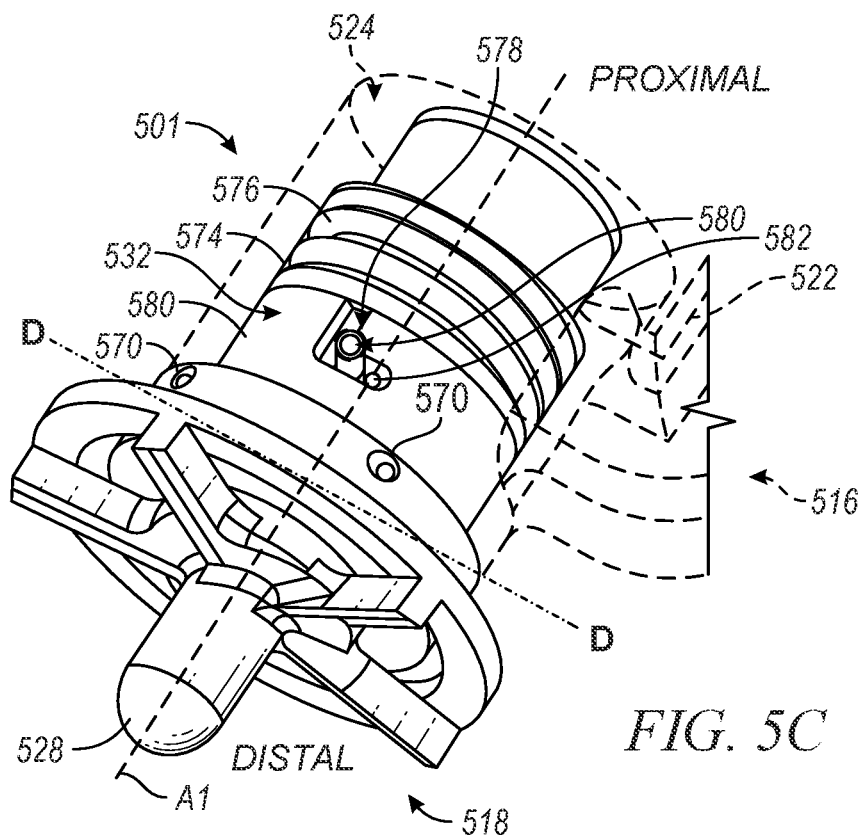
FIG. 5C illustrates an isometric view of a portion of a reaming system for a robotic surgical system.
Figure 5D:
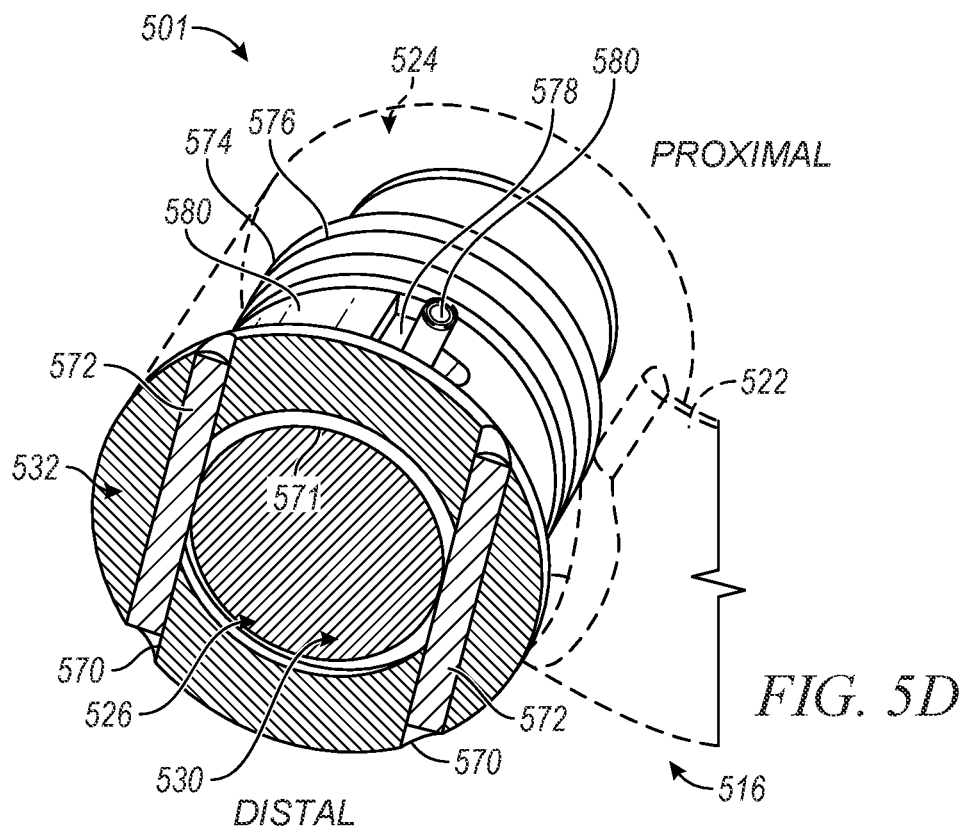
FIG. 5D illustrates an isometric cross-sectional view across indicators of FIG. 5C of a portion of a reaming system for a robotic surgical system.

FIG. 5A illustrates an isometric view of a portion of a reaming system 501 for a robotic surgical system. FIG. 5B illustrates a cross-sectional view of a portion of the reaming system 501 for a robotic surgical system. FIG. 5C illustrates an isometric view of a portion of the reaming system 501 for a robotic surgical system. FIG. 5D illustrates an isometric cross-sectional view across indicators D-D of FIG. 5C of a portion of the reaming system 501 for a robotic surgical system. FIGS. 5A-5D show one example of a quick connection interface for connecting and disconnecting a cutting head or reamer to a reaming guide. FIGS. 5A-5D also show orientation indicators Proximal and Distal and Axis A1. FIGS. 5A-5D are discussed together below. The reaming systems discussed above and below can be modified to include one or more components of the reaming system 501.

A reaming guide 516 can include a housing 524 connected to a distal end thereof. The reamer 518 can include a support 526 and a cutting head 528. The support 526 can include a shaft 530 (shown in FIGS. 5B-5D) and a bushing 532. The support 526 can be connected to the cutting head 528 and the shaft 530 can include a driving feature 534. The shaft 530 can be generally cylindrical, but can have other shapes in other examples, such as hexagonal, octagonal, or the like.

The shaft 530 can be insertable into a bore 568 of the bushing 532 such that the cutting head 538 extends distally from the bushing 532 and a portion of the shaft 530 extends proximally beyond the bushing 532. The bushing 532 can include bores 570 and the shaft 530 can include a groove (e.g., a circumferential groove) or recess 571 in an outer surface of the shaft 530. The groove 571 can be aligned with the bores 570 when the shaft 530 is fully inserted into the bore 568 of the bushing allowing pins 572 to be inserted into the bores 570 of the bushing to extend at least partially into the grove or recess 571. When the pins 572 are secured within the bores 570 and the groove 571, the pins 572 can limit axial movement of the shaft 530 and cutting head 528 with respect to the bushing 532. Because the groove 571 is circumferential, the shaft 530 can still be free to rotate with respect to the bushing 537.

Also, as shown in FIGS. 5B-5D, the housing 524 can include a bore 574 to receive the shaft 530 and the bushing 532 therein. The bore 574 can be sized such that a biasing element 576 can be located therein and around at least a portion of the shaft 530. The biasing element 576 can be a compression coil spring, wave spring, or compressible and resilient member comprised of resilient materials such as rubbers, plastic, or the like. The biasing element 576 can be engaged with the housing 524 and the bushing 532 to bias the bushing 532 distally.

As shown in FIGS. 5B-5D, the bushing 532 can include a slot 578 in an outer surface of a proximal portion 580 of the bushing 532, or the portion 580 of the bushing 532 insertable into the housing 524. The slot 578 can extend through the proximal end of the proximal portion 580 of the bushing 532 and can extend circumferentially along a portion of the outer surface of the proximal portion 580. Optionally, the bushing 532 can include multiple slots. The housing 524 can include a projection 580, which can be a ball plunger or detent ball, such as a biased ball or projection secured to the housing 524. Optionally, the housing 524 can include two or more projections 580. The projection 580 can be insertable into the slot 578 to limit rotation of the bushing 532 with respect to the housing.

That is, when the shaft 530 is inserted into the housing 524 and the bushing 532 engages the biasing element 576 to compress the biasing element 576, the slot 578 can be aligned with the projection 580 such that the projection 580 can be inserted into the slot until the projection reaches a distal end of the slot 578, at which point the bushing 532 can be rotated (such as counter-clockwise from a distal perspective) to position the projection 580 in a recess 582 (shown in FIG. 5C) of the slot 578. The recess 582 can be in a radially inner portion of the circumferential extension of the slot 578. Engagement of the projection 580 with the recess 582 can provide audible or tactile feedback to a user that the cutting head 518 is connected to the housing 524. The biasing element 576 can apply force on the bushing 532 to bias the bushing distally 532 to help limit rotation of the bushing 532 with respect to the housing.

To disengage or detach the reamer 518 from the housing 524, the reamer 518 (and bushing 532) can be rotated (such as clockwise from a distal perspective) to move the projection 580 out of the recess and into the slot 578 until the projection 580 aligns with an axially extending portion of the slot 578 at which point, the biasing element 576 can move the bushing 532 distally, allowing the reamer 518 to be removed from the housing 524. The reaming system 501 can thereby allow cutting heads (and optionally other instruments) to be quickly and easily removed from the reaming guide 516.

Figure 6:
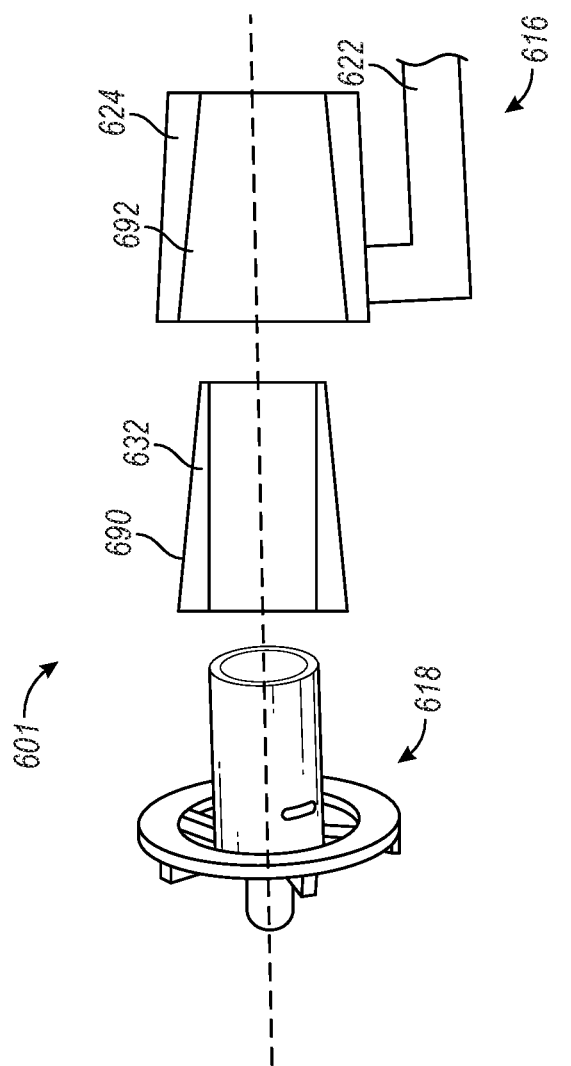
FIG. 6 illustrates an isometric and cross-sectional view of a portion of a reaming system for a robotic surgical system.
Figure 7:
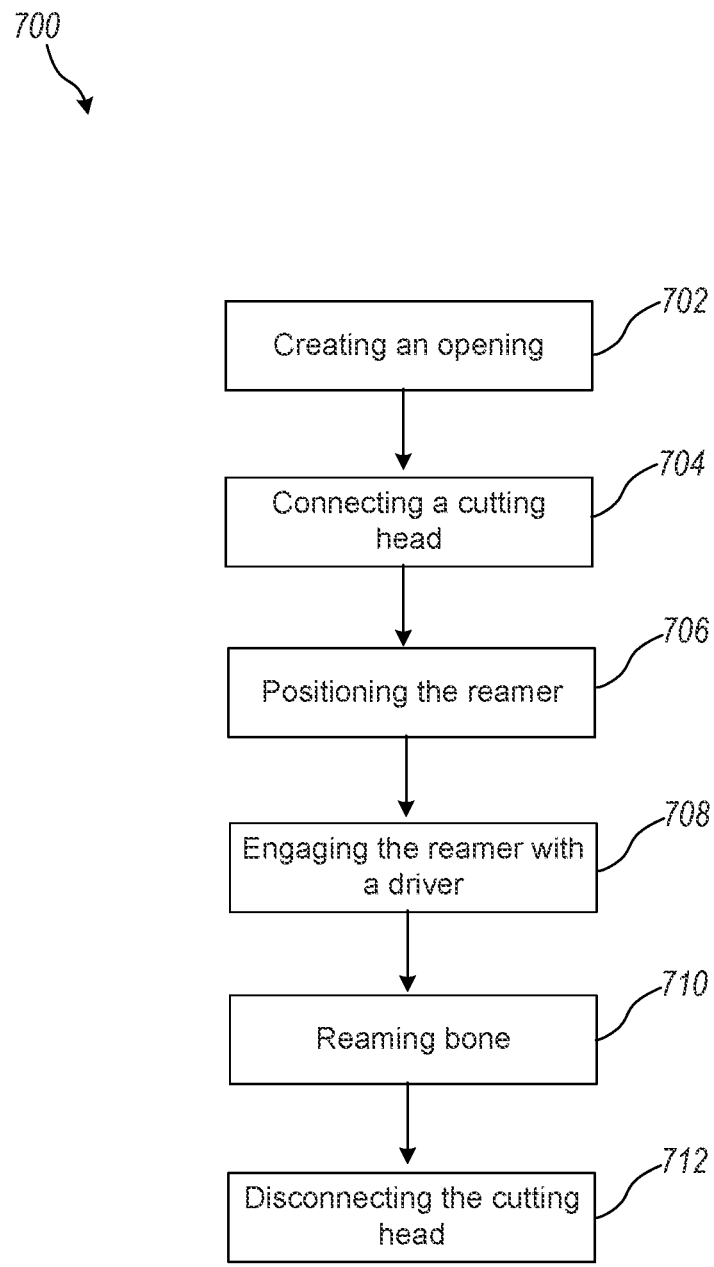
FIG. 7 illustrates a block diagram of an example method.

FIG. 6 illustrates an isometric and cross-sectional view of a portion of a reaming system 601 for a robotic surgical system. The reaming system 601 can be similar to those discussed above; the reaming systems discussed above and below can be modified to include one or more components of the reaming system 601, The reaming system 601 can differ in that a bushing 632 can include a tapered outer surface 690 that is insertable into a housing 624 having a complimentary tapered inner surface 692. The taper-to-taper engagement between the bushing 632 and the housing 624 can help to position the bushing 632 within the housing 624.

While the end effector has been discussed with regard to shoulder and hip arthroplasties, the end effector of the present disclosure can be used in surgical procedures in a wide range of anatomical applications including knee, shoulder, ankle, hip, or elbow procedures. The use of a robotic arm, together with the end effector, can eliminate the need for a guide pin, which can reduce the invasiveness of a joint replacement procedure for a patient.

FIG. 57 illustrates a schematic view of the method 700, in accordance with at least one example of this disclosure. The method 700 can be a method of reaming bone using a reaming system of a robotically-guided surgical arm. More specific examples of the method 700 are discussed below. The steps or operations of the method 700 are illustrated in a particular order for convenience and clarity; many of the discussed operations can be performed in a different sequence or in parallel without materially impacting other operations. The method 700 as discussed includes operations performed by multiple different actors, devices, and/or systems. It is understood that subsets of the operations discussed in the method 700 can be attributable to a single actor, device, or system could be considered a separate standalone process or method.

The method 700 can begin at step 702 where an opening can be created in tissue of a patient and other steps for preparing to ream bone can be taken, such as loading of a model to a surgical system, performing virtual surgery on the model, creating a reaming plan, or the like. At step 704, a cutting head can be connected to a surgical arm. For example, the reamer 218 can be connected to the housing 224 of the reaming guide 216 to connect the reamer 218 to the end effector 106 and the robotic arm 102. The reamer 218 can be connected to the housing 224 using any of the quick connection systems or devices discussed herein.

Once connected, the reamer 218 can be positioned, such as by the surgical arm 102 to a location near bone for reaming operations at step 706. At step 708, a driver, such as the driver 435 can be engaged with the reamer and the driver can be operated to rotate the cutting head or reamer 218 to ream bone at step 710. At step 712, the reamer 218 can be disconnected from the from the guide 216. Optionally, the method 700 can be repeated for multiple cutting operations. Any of the reamers or reaming systems discussed above can be used in the method 700.

Figure 8:
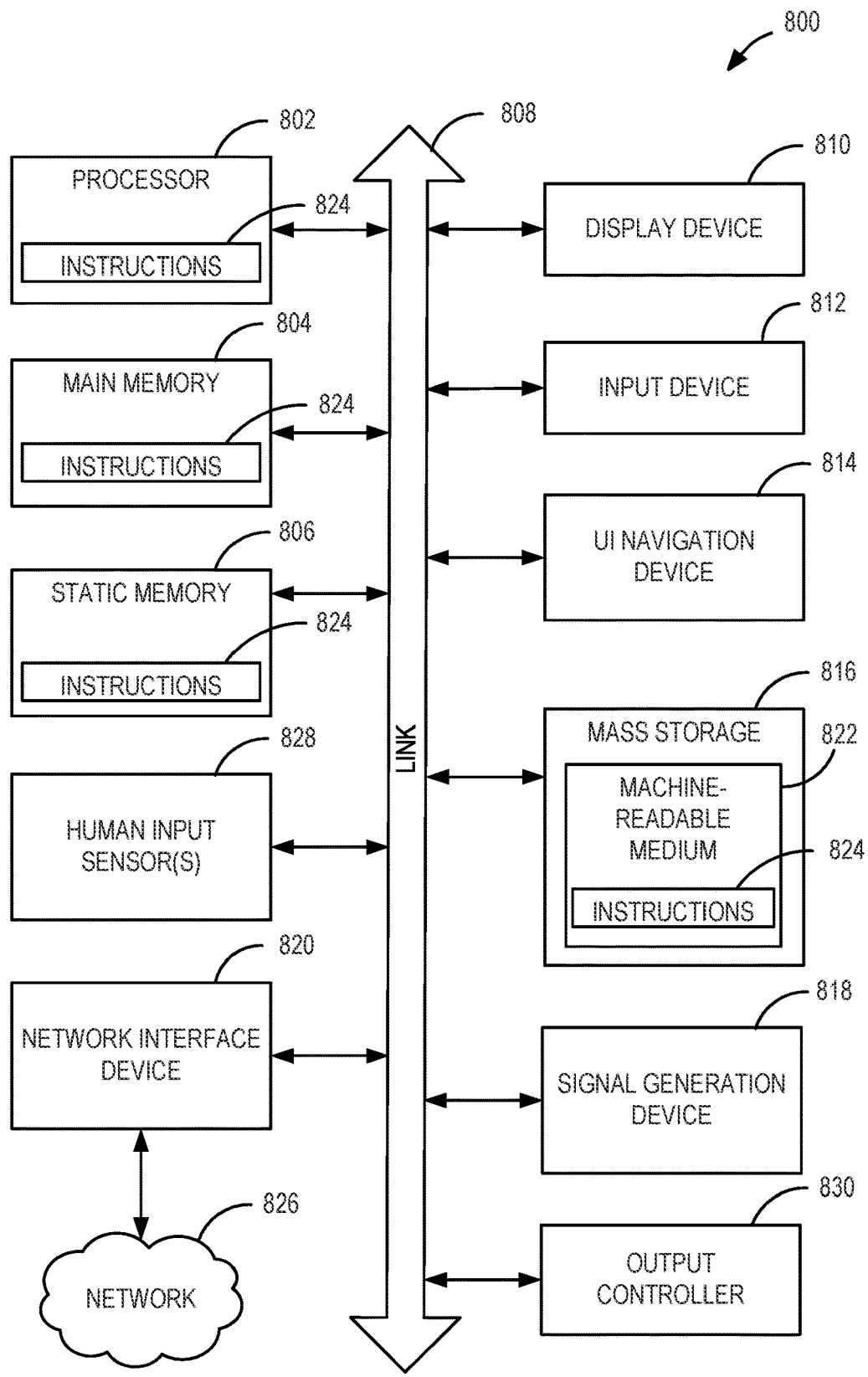
FIG. 8 illustrates a block diagram of an example machine upon which any one or more of the techniques discussed herein can be performed.

FIG. 8 illustrates a block diagram of an example machine 800 upon which any one or more of the techniques (e.g., methodologies) discussed herein may perform. Examples, as described herein, may include, or may operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine e.g., computer system) 800 may include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drive, tape drive, flash storage, or other block devices) some or all of which may communicate with each other via an interlink (e.g., bus) 830. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 808, a signal generation device 818 (e.g., a speaker), a network interface device 820, and one or more sensors 816, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 may be, or include, a machine readable medium 822 on which is stored one or more sets of data structures or instructions 824 (e.g., software) embodying or utilized by any one or more of the techniques or functions described herein. The instructions 824 may also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 may constitute the machine readable media 822. While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

NOTES AND EXAMPLES

The following, non-limiting examples, detail certain aspects of the present subject matter to solve the challenges and provide the benefits discussed herein, among others.)

Example 1 is a reaming system connectable to a robotic surgical system including an end effector of a robotic arm, the reaming system comprising: a reaming guide including: a body releasably couplable to the end effector at a proximal portion of the body; and a housing located at a distal portion of the body; and a reamer operable to ream bone, the reamer comprising: a support releasably couplable to the housing to secure the reamer to the reaming guide and the end effector; and a cutting head connected to the support, the cutting head rotatable with respect to the housing when the support is coupled to the housing.

In Example 2, the subject matter of Example 1 optionally includes wherein: the support includes a bushing releasably couplable to the housing; and the cutting head includes a shaft connected to the bushing and rotatable with respect to the bushing.

In Example 3, the subject matter of Example 2 optionally includes wherein the cutting head includes a driver interface connected to the shaft, the driver interface configured to engage with a driver to rotate the shaft and the cutting head when the reamer is coupled to the housing.

In Example 4, the subject matter of any one or more of Examples 2-3 optionally include wherein: the housing includes a slot extending through at least a portion of the housing; and the bushing includes a projection insertable into the slot to limit rotation of the bushing with respect to the housing.

In Example 5, the subject matter of Example 4 optionally includes wherein the slot extends through a distal end of the housing and circumferentially around a portion of the housing.

In Example 6, the subject matter of Example 5 optionally includes wherein the slot includes a notch in a distal portion of the circumferential extension, the notch configured to receive at least a portion of the projection therein to limit circumferential movement of the projection when the projection is in the notch.

In Example 7, the subject matter of Example 6 optionally includes a biasing element engaged with the housing and the bushing to bias the bushing and the projection distally to bias the projection toward the notch.

In Example 8, the subject matter of any one or more of Examples 2-7 optionally include a plunger connected to the housing and releasably engageable with the bushing to secure the bushing to the housing.

In Example 9, the subject matter of Example 8 optionally includes wherein: the housing includes a bore extending through at least a portion of the housing, the bore configured to receive at least a portion of the plunger therethrough; and the bushing includes a recess alignable with the bore when the bushing is located within the housing, the recess configured to receive at least a portion of the plunger therein to secure the bushing to the housing and to limit rotation of the bushing with respect to the housing.

In Example 10, the subject matter of Example 9 optionally includes a biasing element engaged with the plunger to bias the plunger toward the bore and the recess; and a release connected to the plunger and operable to move the plunger out of the recess or the bore.

In Example 11, the subject matter of any one or more of Examples 2-10 optionally include wherein: the bushing includes a slot extending through at least a portion of the bushing; and the housing includes a projection insertable into the slot to limit rotation of the bushing with respect to the housing.

In Example 12, the subject matter of Example 11 optionally includes a pin; wherein the shaft of the cutting head defines a circumferential groove around an outer surface of the shaft, the groove configured to receive at least a portion of the pin therein; and wherein the bushing includes a bore alignable with the groove when the shaft of the cutting head is inserted into the bushing, the bore configured to retain at least a portion of the pin to limit axial movement of the cutting head with respect to the bushing.

In Example 13, the subject matter of any one or more of Examples 11-12 optionally include a biasing element engageable with the housing and the bushing to bias the bushing distally when the shaft and bushing are inserted into the housing.

In Example 14, the subject matter of Example 13 optionally includes wherein the slot extends through a proximal end of the bushing and circumferentially around a portion of the bushing.

In Example 15, the subject matter of Example 14 optionally includes wherein the slot includes a notch in a radially inner portion of the circumferential extension, the notch configured to receive at least a portion of the projection therein to limit circumferential movement of the projection when the projection is in the notch.

In Example 16, the subject matter of Example 15 optionally includes wherein the projection is a sprung detent ball.

In Example 17, the subject matter of any one or more of Examples 11-16 optionally include wherein at least a portion of the bushing is insertable into the house ng.

In Example 18, the subject matter of any one or more of Examples 1-17 optionally include wherein the body is curved between the proximal portion and the housing.

Example 19 is a reaming system connectable to a robotic surgical system including an end effector of a robotic arm, the reaming system comprising: a reaming guide including: a proximal portion connectable to the end effector; and a housing located opposite the proximal portion; and a reamer comprising: a support releasably couplable to the housing to secure the reamer to the reaming guide and the end effector; and a cutting head connected to the support, the cutting head rotatable with respect to the housing when the support is coupled to the housing.

In Example 20, the subject matter of Example 19 optionally includes wherein: the support includes a bushing releasably couplable to the housing; and the cutting head includes a shaft connected to the bushing and rotatable with respect to the bushing.

In Example 21, the subject matter of Example 20 optionally includes wherein the cutting head includes a driver interface connected to the shaft, the driver interface configured to engage with a driver to rotate the shaft and the cutting head when the reamer is coupled to the housing.

In Example 22, the subject matter of any one or more of Examples 20-21 optionally include wherein: the housing includes a slot extending through at least a portion of the housing; and the bushing includes a projection insertable into the slot to limit rotation of the bushing with respect to the housing.

In Example 23, the subject matter of any one or more of Examples 20-22 optionally include a plunger connected to the housing and releasably engageable with the bushing to secure the bushing to the housing.

In Example 24, the subject matter of any one or more of Examples 20-23 optionally include wherein: the bushing includes a slot extending through at least a portion of the bushing; and the housing includes a projection insertable into the slot to limit rotation of the bushing with respect to the housing.

Example 25 is a robotic surgical system comprising for reaming a bone, the system comprising: a robotic arm including an end effector; a reaming guide including: a body releasably couplable to the end effector at a proximal portion of the body; and a housing located at a distal portion of the body; a reamer operable to ream bone, the reamer comprising: a support releasably couplable to the housing to secure the reamer to the reaming guide and the end effector; and a cutting head connected to the support, the cutting head rotatable with respect to the housing when the support is coupled to the housing; and a controller configured to monitor and adjust a position of the reamer relative to the bone.

In Example 26, the subject matter of Example 25 optionally includes wherein: the support includes a bushing releasably couplable to the housing; and the cutting head includes a shaft connected to the bushing and rotatable with respect to the bushing.

In Example 27, the subject matter of Example 26 optionally includes wherein the cutting head includes a driver interface connected to the shaft, the driver interface configured to engage with a driver to rotate the shaft and the cutting head when the reamer is coupled to the housing.

In Example 28, the subject matter of any one or more of Examples 26-27 optionally include wherein: the housing includes a slot extending through at least a portion of the housing; and the bushing includes a projection insertable into the slot to limit rotation of the bushing with respect to the housing.

In Example 29, the subject matter of any one or more of Examples 26-28 optionally include a plunger connected to the housing and releasably engageable with the bushing to secure the bushing to the housing.

In Example 30, the subject matter of any one or more of Examples 26-29 optionally include wherein: the bushing includes a slot extending through at least a portion of the bushing; and the housing includes a projection insertable into the slot to limit rotation of the bushing with respect to the housing.

In Example 31, the apparatuses or method of any one or any combination of Examples 1-30 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A reaming system connectable to a robotic surgical system including an end effector of a robotic arm, the reaming system comprising:
   a reaming guide including:
      a body releasably couplable to the end effector at a proximal portion of the body; and
      a housing located at a distal portion of the body, the housing including a slot extending through at least a portion of the housing, the slot extending through a distal end of the housing and circumferentially around a portion of the housing; and a reamer operable to ream bone, the reamer comprising:
  a support releasably couplable to the housing to secure the reamer to the reaming guide and the end effector, the support including a bushing releasably couplable to the housing, and the bushing including a projection insertable into the slot to limit rotation of the bushing with respect to the housing; and
  a cutting head connected to the support, the cutting head rotatable with respect to the housing when the support is coupled to the housing, the cutting head including a shaft connected to the bushing and rotatable with respect to the bushing.

2. The system of claim 1, wherein the cutting head includes a driver interface connected to the shaft, the driver interface configured to engage with a driver to rotate the shaft and the cutting head when the reamer is coupled to the housing.

3. The system of claim 1, wherein the slot includes a notch in a distal portion of the circumferential extension, the notch configured to receive at least a portion of the projection therein to limit circumferential movement of the projection when the projection is in the notch.

4. The system of claim 3, further comprising:
a biasing element engaged with the housing and the bushing to bias the bushing and the projection distally to bias the projection toward the notch.

5. A reaming system connectable to a robotic surgical system including an end effector of a robotic arm, the reaming system comprising:
  a reaming guide including:
    a body releasably couplable to the end effector at a proximal portion of the body; and
    a housing located at a distal portion of the body, the housing including a bore extending through at least a portion of the housing; and
  a reamer operable to ream bone, the reamer comprising:
    a support releasably couplable to the housing to secure the reamer to the reaming guide and the end effector, the support including a bushing releasably couplable to the housing, the bushing including a recess alignable with the bore when the bushing is located within the housing; and
    a cutting head connected to the support, the cutting head rotatable with respect to the housing when the support is coupled to the housing, and the cutting head including a shaft connected to the bushing and rotatable with respect to the bushing;
  a plunger connected to the housing and releasably engageable with the bushing to secure the bushing to the housing, the plunger configured to extend at least partially through the bore of the housing, and at least a portion of the plunger configured to extend into the recess to secure the bushing to the housing and to limit rotation of the bushing with respect to the housing.

6. The system of claim 5, further comprising:
a biasing element engaged with the plunger to bias the plunger toward the bore and the recess; and a release connected to the plunger and operable to move the plunger out of the recess or the bore.

7. The system of claim 5, wherein the cutting head includes a driver interface connected to the shaft, the driver interface configured to engage with a driver to rotate the shaft and the cutting head when the reamer is coupled to the housing.

8. A reaming system connectable to a robotic surgical system including an end effector of a robotic arm, the reaming system comprising:
  a reaming guide including:
    a body releasably couplable to the end effector at a proximal portion of the body; and
    a housing located at a distal portion of the body, the housing including a projection;
  a reamer operable to ream bone, the reamer comprising:
    a support releasably couplable to the housing to secure the reamer to the reaming guide and the end effector, the support including a bushing releasably couplable to the housing, the bushing including a slot extending through at least a portion of the bushing, the projection insertable into the slot to limit rotation of the bushing with respect to the housing; and
    a cutting head connected to the support, the cutting head rotatable with respect to the housing when the support is coupled to the housing, and the cutting head including a shaft connected to the bushing and rotatable with respect to the bushing; and
  a biasing element engageable with the housing and the bushing to bias the bushing distally when the shaft and bushing are inserted into the housing.

9. The system of claim 8, further comprising:
a pin;
wherein the shaft of the cutting head defines a circumferential groove around an outer surface of the shaft, the groove configured to receive at least a portion of the pin therein; and
wherein the bushing includes a bore alignable with the groove when the shaft of the cutting head is inserted into the bushing, the bore configured to retain at least a portion of the pin to limit axial movement of the cutting head with respect to the bushing.

10. The system of claim 8, wherein the slot extends through a proximal end of the bushing and circumferentially around a portion of the bushing.

11. The system of claim 10, wherein the slot includes a notch in a radially inner portion of the circumferential extension, the notch configured to receive at least a portion of the projection therein to limit circumferential movement of the projection when the projection is in the notch.

12. The system of claim 11, wherein the projection is a sprung detent ball.

13. The system of claim 8, wherein at least a portion of the bushing is insertable into the housing.

14. The system of claim 8, wherein the cutting head includes a driver interface connected to the shaft, the driver interface configured to engage with a driver to rotate the shaft and the cutting head when the reamer is coupled to the housing.

* * * * *